United States Patent [19] [11] 3,882,763
Ellerbrock et al. [45] May 13, 1975

[54] METHOD FOR FORMING END SEAM CONSTRUCTION FOR COMPOSITE CONTAINERS

[75] Inventors: Donald H. Ellerbrock, Florissant; John E. Bacon, St. Charles, both of Mo.

[73] Assignee: Boise Cascade Corporation, Boise, Idaho

[22] Filed: Feb. 14, 1974

[21] Appl. No.: 442,399

[52] U.S. Cl. ...... 93/55.1 M; 93/36.5 R; 93/39.1 R; 113/120 XY; 113/120 Y
[51] Int. Cl. .............................................. B31b 1/74
[58] Field of Search..... 113/120 K, 120 XY, 120 Y, 113/1 E; 229/5.6; 93/36.5 R, 36.5 SS, 55.1 M, 55.1 R, 36 B, 39.1 R, 39.1 P

[56] References Cited
UNITED STATES PATENTS

| 2,154,349 | 4/1939 | O'Brien | 113/120 XY |
| 2,643,627 | 6/1953 | Wobbe | 113/120 Y |
| 2,956,528 | 10/1960 | Magill | 93/36.5 R UX |
| 3,182,571 | 5/1965 | Carpenter et al. | 93/55.1 M |
| 3,381,594 | 5/1968 | Ellerbrook et al. | 229/5.6 X |
| 3,580,464 | 5/1971 | Griffith | 229/5.6 |

Primary Examiner—Roy Lake
Assistant Examiner—James F. Coan
Attorney, Agent, or Firm—Lawrence E. Laubscher

[57] ABSTRACT

An improved end seam construction for composite containers used in the packaging of hard to hold materials, such as materials under vacuum or pressure. The composite tubular body wall member includes at least one fibrous layer to the inner wall surface of which is bonded by a thermoplastic adhesive a metal liner layer that projects axially at at least one end a given distance beyond the fibrous layer. The end of the fibrous layer is deformed radially outwardly to define a funnel-shaped flange about which the projecting metal liner layer is deformed and compressed. The length of the projecting metal liner layer is such that when the metal-lined flange portion is connected by a rolled seam with the flange, the metal liner layer is compressed into surface-to-surface engagement with at least one surface of the curl portion of the metal end. In order to position a sealing compound layer solely in the space between the rolled flange portion and the chuck wall and seaming panel portions of the metal end, an annular layer of the sealing compound is placed on the metal end, prior to connection with the composite body wall, from a point high on the chuck wall to a point on the seaming panel opposite the curl overhang.

11 Claims, 17 Drawing Figures

1

METHOD FOR FORMING END SEAM CONSTRUCTION FOR COMPOSITE CONTAINERS

This invention relates to an end seam construction for composite containers adapted to receive hard-to-package materials under pressure or vaccum, such as beer, coffee, aerosols, tennis balls or the like.

It is well known in the composite container art to line the inner surfaces of the helically wound fibrous (i.e., paperboard) layers with metal foil, a synthetic plastic material or the like, thereby to protect the fibrous layers from the moisture contained in the packaged goods. One example of such a composite container for packaging products under substantial pressure is disclosed by the Wannamaker et al. U.S. Pat. No. 3,428,239. Furthermore, the use of sealing compounds in the rolled seam connection between the body wall and end closure members of a container is presented by the patents to Bierman et al. U.S. Pat. No. 2,986,319, Smith U.S. Pat. No. 3,221,922, Kane U.S. Pat. No. 3,353,705 and Price U.S. Pat. No. 3,403,813, among others. In the Austrian Pat. No. 193,786, it was proposed to cause the metal inner liner layer of a composite container to project axially beyond the fibrous layer, whereby when the metal end is connected with the composite body wall by a rolled seam, a metal-to-metal surface engagement is effected between the projecting metal liner layer and the curl or hook portion of the metal end.

Owing to the desirability of packaging in composite containers under vacuum or pressure conditions certain hard-to-hold products — such as aerosols, coffee, beer, tennis balls and the like — efforts have been made to develop an improved hermetically-sealed rolled seam connection between the metal end and body wall members of a composite container, which seam construction combines the advantages afforded both by the layer of sealing compound and also the metal-to-metal seal between the projecting metal liner portion and the metal end curl.

Accordingly, a primary object of the present invention is to provide an improved rolled end seam connection between the body wall and metal end members of a composite container, characterized in that the body wall member is provided with a tubular metal inner liner layer that is bonded to the inner surface of the fibrous body wall layer and projects axially at at least one end a given distance therefrom, said body wall end being deformed outwardly to define a funnel-shaped flange about which the projecting metal liner layer is deformed and compressed. Consequently, the fully metal-lined funnel-shaped flange portion assists in the filling of the container and the metal liner protects the fibrous layer from the moisture in the packaged goods. Owing to the compression of the metal liner layers inwardly upon the flange, the flange is given a particular rigidity to assure proper integrity of the resultant rolled seam. The length of the projecting metal liner layer is such that after the projecting liner has been deformed around the flange portion and the flange portion is connected by the rolled seam with the metal end, the metal liner is in surface-to-surface contact with at least that surface of the metal end curl portion that faces the seaming panel portion. According to a second embodiment, the length of the projecting liner portion is such that the projecting liner portion is wrapped around the metal end curl portion and is in compressed metal-to-metal engagement not only with the surface of the curl portion that faces the seaming panel portion, but also the curl surface that faces the chuck wall portion.

A further object of the present invention is to provide an end seam construction of the type described above, wherein a layer of sealing compound is provided solely between the rolled flange portion and the chuck wall and seaming panel portions of the metal end without interference with the desired metal-to-metal contact between the projecting metal liner and the curl portion of the metal end. To this end, prior to assembly of the metal end and body wall components, an annular layer of sealing compound in the fluid condition is applied upon the juncture between the chuck wall and seaming panel portions of the metal end. In order to obtain a desired cross-sectional configuration of this annular layer, the sealing compound is applied with controlled conditions of viscosity and rotation of the metal end about its center axis, whereby the sealing compound extends upwardly on the chuck wall to a point approximately opposite the extremity of the metal curl, and the radial extremity of the outer periphery of the sealing compound layer terminates beneath the edge of the curl overhang.

According to a further object of the invention, the method for forming the end seam construction includes the step of forming at at least one end of the body wall member an outwardly divergent funnel-shaped flange portion the inner and outer surfaces of which are lined with metal, said flange portion being subsequently connected with the metal end to form the rolled seam connection. In one embodiment, the fibrous body wall layer is completely severed a given length from one end of the body wall member, the end is heated to melt the thermoplastic bond between the metal liner layer and the fibrous layer, whereupon the severed fibrous end section is removed and the liner portion projects axially from the remaining fibrous layer. The flange is formed in the end portion of the remaining fibrous layer, whereupon the projecting metal liner layer is deformed reversely about and is compressed into engagement with the outer surface of the fibrous flange portion, thereby completely lining the same. In a second embodiment, only the outer peripheral portion of the end portion of the fibrous layer is removed (either by skiving or by severing an outer ply of the fibrous layer, heating the end to melt the thermoplastic seal between the plies, and axially removing the severed ply portion) whereby the metal inner liner layer and the remaining inner peripheral portion of the fibrous layer project axially from the remaining outer peripheral portion of the fibrous layer. These projecting liner and fibrous layer portions are reversely folded outwardly and backwardly upon themselves about their midpoint, whereupon the metal-lined fibrous end is flanged to the funnel-shaped configuration. Owing to the metal lining of the inner and outer surfaces of the flange, the fibrous layer of the flange is protected from moisture during the filling of the container, and a metal surface is provided for tight compression engagement with the corresponding curl surface of the metal end, thereby affording a seal of high integrity.

Other objects and advantages of the invention will become apparent from a study of the following specification when viewed in the light of the accompanying drawing, in which.

Figure 1:
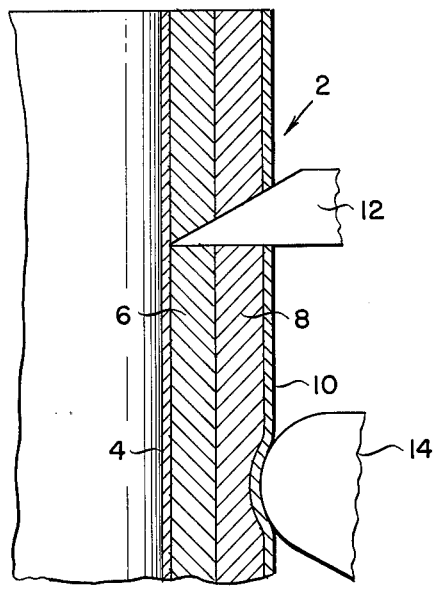
FIG. 1 is a detailed view illustrating the cutting and scoring steps of the body wall member.
Figure 2:
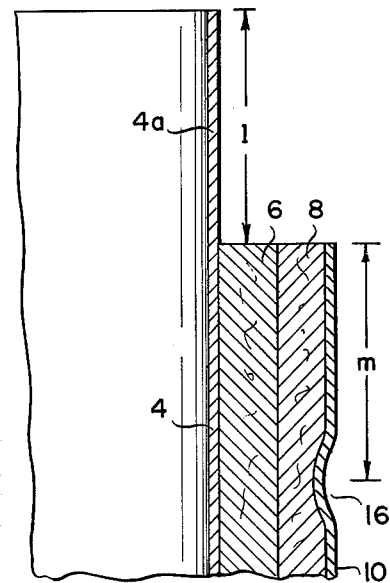
FIG. 2 is a detailed view of the body wall member with the severed fibrous layer portion removed.

Referring first more particularly to FIGS. 1 and 2, the tubular composite container body wall member 2 includes a helically-wound inner liner layer 4 formed of metal (such as aluminum foil, a steel layer, or the like), said inner liner layer being bonded by a thermoplastic adhesive (such as a layer of polyethylene) to the inner surface of the fibrous body wall layer which includes helically-wound fibrous plies 6 and 8 (formed of paperboard, for example) and an outer label layer 10 (formed of paper, foil or the like). At a given distance "1" (on the order of 1/32 to 1/8 inch from at least one end of the body wall member, the fibrous plies 6 and 8 are severed by the knife means 12 which define a continuous circumferential cut. Furthermore, at a second distance "m" from this cut, the outer surface of the fibrous body wall layer is scored by the scoring tool 14 to define a continuous circumferential scoreline 16. Preferably the cutting and scoring steps are accomplished with relative rotational movement between the body wall member and the cutting and scoring tools. The end portion of the body wall member is then heated to the melting point of the adhesive, whereupon the severed fibrous plies are axially removed, thereby leaving the axially projecting portion 4a of the inner liner layer.

Figure 3:
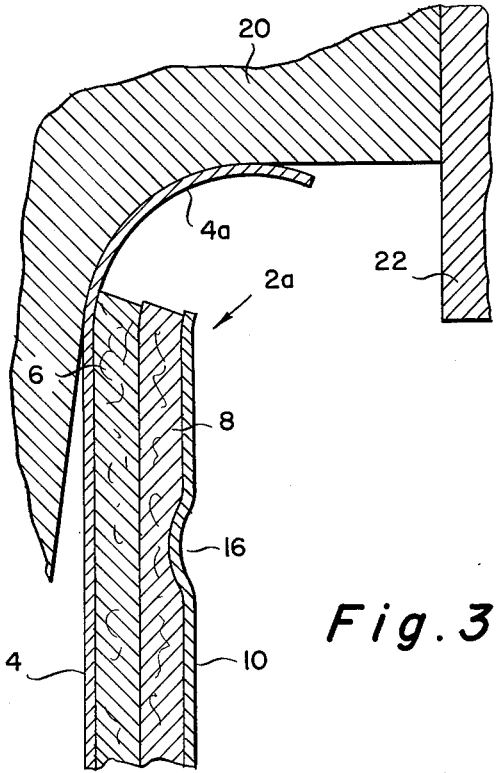
FIGS. 3–5 illustrate the steps of flanging the body wall member and reversely deforming the projecting metal liner layer about the outer surface of the flange portion.
Figure 4:
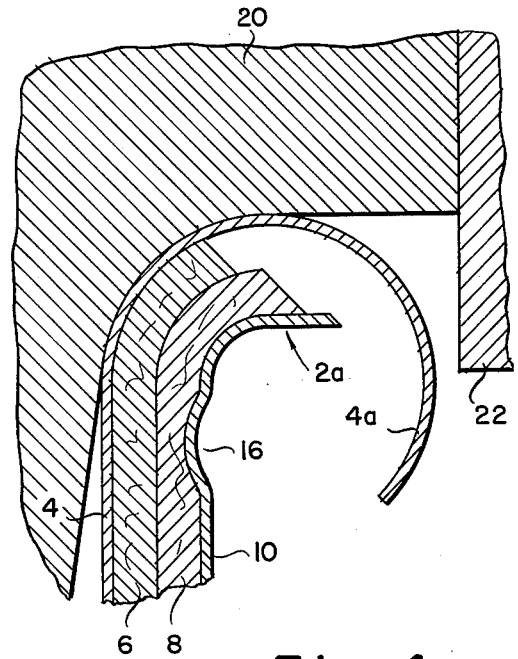
Figure 5:
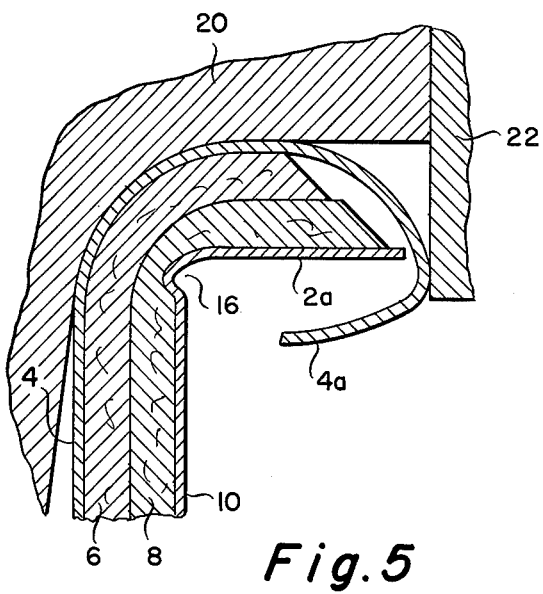

Referring now to FIGS. 3–5, the body wall member is axially displaced relative to a flanging die 20, whereupon the end of the body wall member is progressively deformed to define the radially outwardly divergent funnel-shaped flange portion 2a. As shown in FIG. 5, the axially projecting liner portion 4a eventually engages the stop ring 22, whereupon the projecting liner portion is reversely deformed about the outer surface of the flange portion 2a. As shown in FIGS. 3–5, the scoreline 16 defines the locus of initiation of the flange portion 2a of the body wall member 2.

Figure 6:
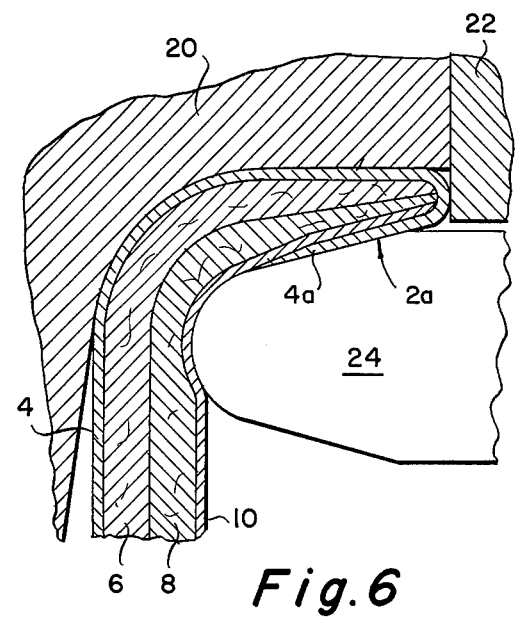
FIG. 6 illustrates the step of compressing together the flange portion and the reversely deformed liner layer.

Referring now to FIG. 6, the metal-lined flange portion 2a is then compressed by the cooperation between flanging die 20, stop ring 22 and comprising tool 24, thereby providing a firm smooth flange portion on the body wall. Owing to the sliding displacement between the adjacent ends of the fibrous layers 8 and 10 during the flanging operation (as shown in FIGS. 4 and 5), the flange portion 2a is somewhat tapered to facilitate the compression step of FIG. 6.

Figure 7:
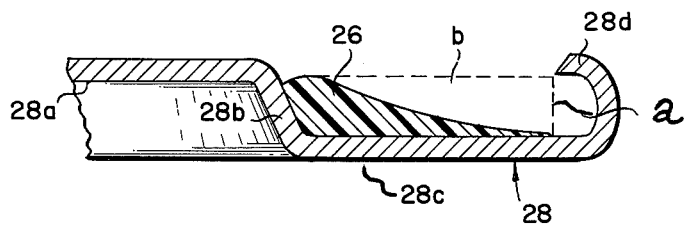
FIG. 7 illustrates the preliminary step of applying the sealing compound to the inverted metal end.

Referring now to FIG. 7, a predetermined quantity 26 of a suitable sealing compound (such as Dewey & Almy sealing compound No. 92-22, a solvent-base rubber compound) is applied as an annular layer to the upper surface of the inverted metal end member 28. More particularly, the metal end member includes a central panel portion 28a, and annular chuck wall portion 28b connected at one end with the central panel portion, an annular seaming wall portion 28c connected at its inner periphery with the other end of the chuck wall portion, and a curl portion 28d connected with the outer periphery of the seaming panel portion and arranged concentrically about the chuck wall portion. The sealing compound quantity 26 is deposited as an annular layer on the surface of the junction between the chuck wall and seaming panel portions. The configuration of the annular layer of sealing compound is controlled by the viscosity of the sealing compound together with the rate of rotation of the metal end about its axis. Preferably the spin rate (normally about 850rpm) and the viscosity factors are so controlled that the inner periphery of the sealing compound layer extends upwardly along the chuck wall to a height between the curl height "a" in FIG. 7 and the height $a$ minus one thirty-second inch. The annular layer of sealing compound extends radially outwardly on the seaming panel to the edge of the curl portion 28d as shown by the line $b$ in FIG. 7. Thus, the annular layer of sealing compound terminates short of the curl portion 28d of the metal end.

Figure 8:
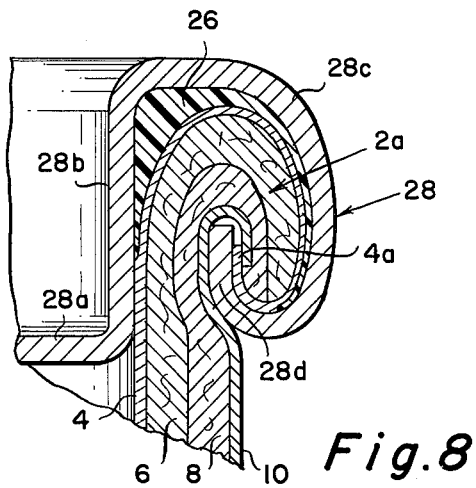
FIG. 8 illustrates the rolled seam connection produced by the method of the present invention.

Referring now to FIG. 8, the metal end member 28 is then inverted, and assuming that the body wall member has been closed at its lower end and filled with the selected material, the metal end is mounted on the flanged portion of the body wall member to close the filled container. The metal end and body wall members are then joined by a conventional roll seaming step. In accordance with a characterizing feature of the invention, the projecting metal liner portion 4a and the curl portion 28d are compressed into tight metal-to-metal surface engagement, the sealing compound being contained in compressed relation solely between the flange portion 2a and chuck wall and seaming panel portions of the metal end.

Owing to the metal lining on both the inner and outer surfaces of the compressed flange 2a, the ends of the fibrous layers 4 and 6 are protected against wetting during filling of the composite container with a liquid material, whereby subsequent softening of the fibrous layers of the flange portion due to moisture is eliminated.

Figure 9:
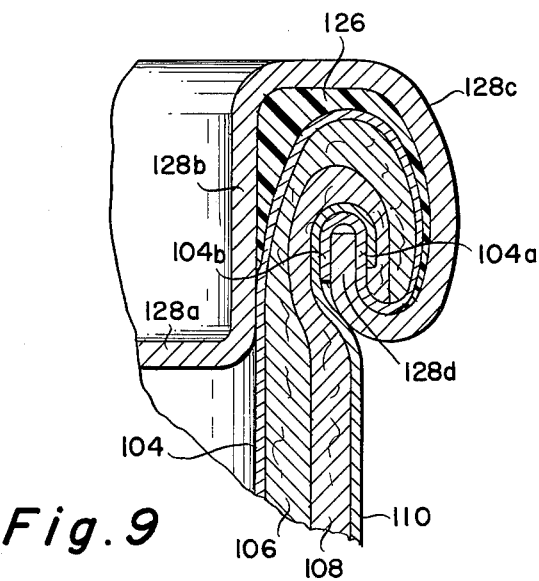
FIG. 9 illustrates a second embodiment of the rolled seam connection of the present invention.
Figure 10:
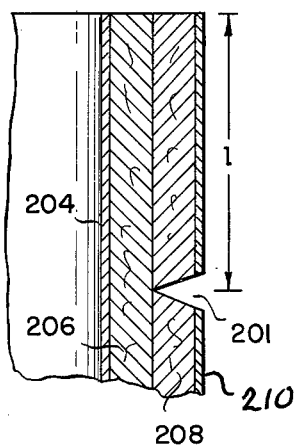
FIGS. 10–14 illustrate an alternate method for forming the metal-lined flange.

Referring now to the modification of FIG. 9, the length of the axially projecting metal liner is increased to define a further projecting portion 104b that extends around the curl portion 128d and is compressed into tight metal-to-metal contact with the surface of the curl portion that faces the chuck wall portion 128b. Consequently, owing to the covering of both sides of the extremity of the curl portion 128d by the liner projecting portions 104a and 104b, the fibrous and label layers 106, 108 and 110 are protected against cutting by the sharp edges of the curl portion, thereby alleviating the problem of the ends blowing off as a result of sustained internal pressure developed by the contents of the container.

In both the embodiments of FIGS. 8 and 9, the quantity of sealing compound placed on the seaming panel portion of the metal end extends from a point high on the chuck wall (even with the top of the curl) out to a point that will allow the compound to seal along the entire length of the flange portion without extending to the curl portion of the end, thereby affording maximum sealing effect without interferring with the metal-to-metal engagement between the projecting metal liner and curl surfaces.

The improved rolled seam connection between the composite body wall and the metal end is particularly suitable for the packaging of products under high pressure or high vacuum conditions.

Figure 11:
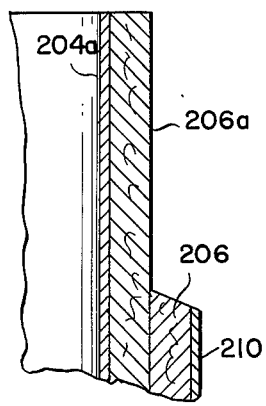
Figure 12:
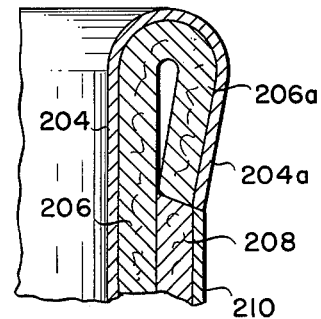
Figure 13:
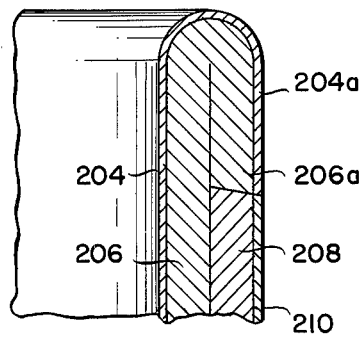
Figure 14:
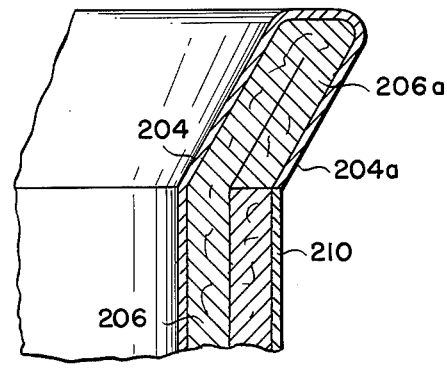
Figure 15:
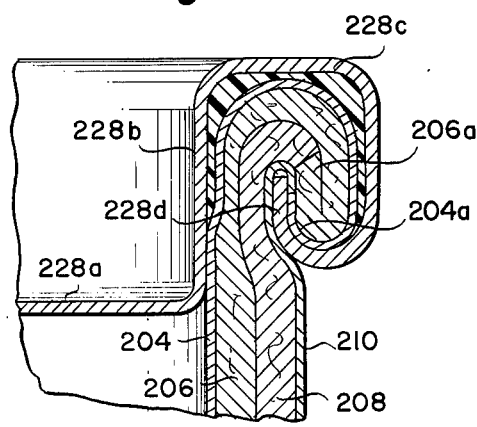
FIGS. 15 and 16 illustrate two embodiments of rolled seam connections formed by the method of FIGS. 10–14.

Referring now to the embodiment of FIGS. 10-14, a circumferential cut is formed in the outer circumference of the fibrous body wall through only the label layer 210 and the outer ply 208. In the event that the two plies are bonded together by a thermoplastic adhesive, the end is heated to break the bond, whereupon the severed portion of the outer ply is axially removed, whereupon both the inner liner portion 204a and the inner ply portion 106a project axially beyond the outer ply 206 as shown in FIG. 11. The projecting portion is then reversely folded backwardly upon itself about its midpoint as shown in FIG. 12, and compressed to a flat condition as shown in FIG. 13. The end is then flanged outwardly to define the metal-lined funnel-shaped flange of FIG. 14, whereupon the flange is connected with the end to define the rolled seam of FIG. 15, the projecting metal liner layer being in surface-to-surface contact with the surface of curl portion 228d that faces the seaming panel portion 228c.

Figure 16:
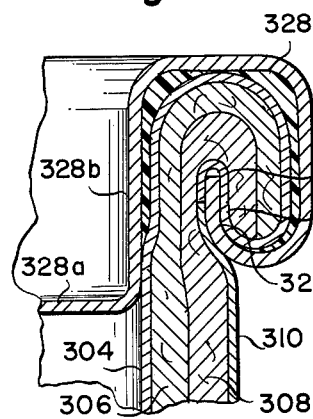

Of course, the length by which the metal liner and inner ply layers project may be increased by increasing the cut distance l, whereupon the projecting metal liner is provided with a further extension 304b which completely wraps around the metal curl portion 328d in compressed metal-to-metal engagement with both sides thereof, as shown in FIG. 16.

Figure 17:
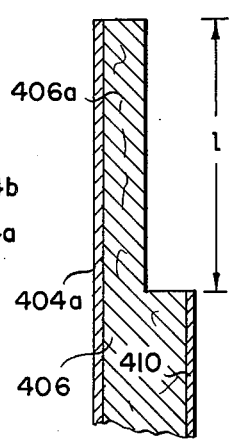
FIG. 17 illustrates an alternate method for forming the partially-stripped body wall member of FIG. 11.

Referring now to FIG. 17, an alternate method is disclosed for reducing the outer peripheral surface of the metal end to define the axially-projecting metal liner and inner peripheral portions 404a and 406a, respectively. In this embodiment, the outer peripheral surface of the fibrous layer is skived (i.e., ground off with a rotary tool) by the length l. The projecting portion is then folded back upon itself, flanged, and rolled into a seam in the manner illustrated in FIGS. 12-15.

While in accordance with the Patent Statutes, the preferred form and embodiments of the invention have been illustrated and described, it will be apparent that various changes may be made without deviating from the disclosed invention.

What is claimed is:

1. The method of connecting a metal end member to the body wall member of a composite container, said metal end member including a central end wall portion, a generally tubular chuck wall portion connected at one end with and extending axially from the outer periphery of said end wall portion, an annular seaming panel portion connected at its inner periphery with the other end of said chuck wall portion, and a generally tubular inwardly-facing curl portion connected at one end with the outer periphery of said seaming panel portion and arranged in concentrically spaced relation about said chuck wall portion, said body wall member including a tubular layer formed of fibrous material, and a tubular inner liner layer formed of metal bonded to the inner wall surface of said fibrous layer, which comprises the steps of:

a. removing at at least one end of said body wall member a given length of at least the outer peripheral portion of said fibrous layer, whereby said metal liner layer projects axially said given length beyond the remaining outer peripheral portion of said fibrous layer;

b. deforming said one end of said body wall radially outwardly to define a funnel-shaped fibrous flange portion about at least a portion of the external surface of which said projecting metal liner portion is reversely deformed;

c. mounting said metal end member on the compressed metal-lined flange portion of said body wall member, the central end wall portion of said metal end member being seated within the body wall member; and d. rolling together and radially-inwardly compressing the seaming panel and curl portions of said metal end member with the metal-lined flange portion of said body wall member, thereby to cause said metal-lined flange portion of said body wall member to be compressed between the curl and seaming panel portions of said metal end member, and the portion of said body wall member adjacent said flange portion to be compressed between the curl and chuck wall portions of said end member, the length of the projecting metal liner portion being such that said projecting liner portion is compressed in metal-to-metal surface engagement with at least that surface of said curl portion that faces the seaming panel portion of said metal end.

2. The method as defined in claim 1, and further including the step of applying an annular layer of sealing compound, prior to mounting of the metal end member on the body wall member, on the junction between the external surface of the metal end chuck wall and seaming panel portions, the quantity of said sealing compound being sufficient, when said metal end member is joined by the rolled seam connection with said body member, to define a layer of sealing compound solely in the space between said metal-lined flange portion and the chuck wall and seaming panel portions of said metal end member, respectively, said sealing compound layer terminating short of the metal-to-metal engaging surfaces of said projecting metal liner and said curl portions, respectively.

3. The method as defined in claim 2, wherein the metal end is spun about its axis at such a rate and the sealing compound has such a viscosity that prior to connection of the metal end member to the body wall member the inner periphery of the sealing compound layer has a height equal to the distance between the curl overhang and the seaming panel, and the sealing compound layer terminates at its outer periphery adjacent the junction between the seaming panel and curl portions.

4. The method as defined in claim 3, wherein the length of said projecting metal liner portion is such that said projecting liner portion extends around said curl portion and is compressed in tight metal-to-metal engagement also with the surface of said metal curl portion that faces the chuck wall portion of said metal end member.

5. The method as defined in claim 1, wherein said metal inner liner layer is bonded to said fibrous layer with a thermoplastic adhesive layer;
   a. and further including the preliminary steps of defining a continuous circumferential cut solely in and extending completely through said fibrous body layer at a distance equal to said given length from the end of said body wall member; and
   b. heating said end of said body member to the melting temperature of the adhesive and removing the severed length of said fibrous body wall layer, whereby said metal liner layer projects axially beyond the end of said fibrous layer.

6. The method as defined in claim 5, and further including the steps of reversely deforming the projecting metal liner layer concentrically around the outer surface of said body wall fibrous flange portion and tightly compressing together said flange portion and said reversely deformed metal liner layer.

7. The method as recited in claim 5, and further including the preliminary step, prior to the formation of the flange portion on said body wall member, of defining a circumferential scoreline in the outer surface of said fibrous body wall layer at a second length greater than said given length from the end of the body member, thereby to define the locus of initiation of the flange portion.

8. The method as defined in claim 1, wherein only the outer peripheral portion of said fibrous layer is removed an axial distance equal to said given length, whereby the inner peripheral portion of said fibrous layer projects axially beyond the remaining outer peripheral portion.

9. The method as defined in claim 8, wherein said outer peripheral portion of said fibrous layer is removed by skiving.

10. The method as defined in claim 1, wherein said fibrous layer comprises at least two concentrically-arranged plies bonded with a thermoplastic adhesive, and further including the preliminary steps of:
    a. defining at said given distance from the end of said body member solely in the outer fibrous ply a continuous circumferential cut that extends radially inwardly completely through said outer fibrous ply, and
    b. heating said one end of said body member to the melting temperature of the thermoplastic adhesive and removing the severed length of the outer fibrous ply.

11. The method as defined in claim 10, and further including the step of reversely folding outwardly and backwardly upon itself prior to the flanging step the projecting metal inner liner portion together with the portion of the inner fibrous ply that projects axially beyond the outer fibrous ply.

* * * * *